May 22, 1951     O. S. MUNGER     2,554,261
VEHICLE WHEEL SUSPENSION WITH HYDRAULIC STEERING
Filed Nov. 5, 1946     4 Sheets-Sheet 1

Inventor
ORMOND S. MUNGER
By Norman E. Miller
Attorney

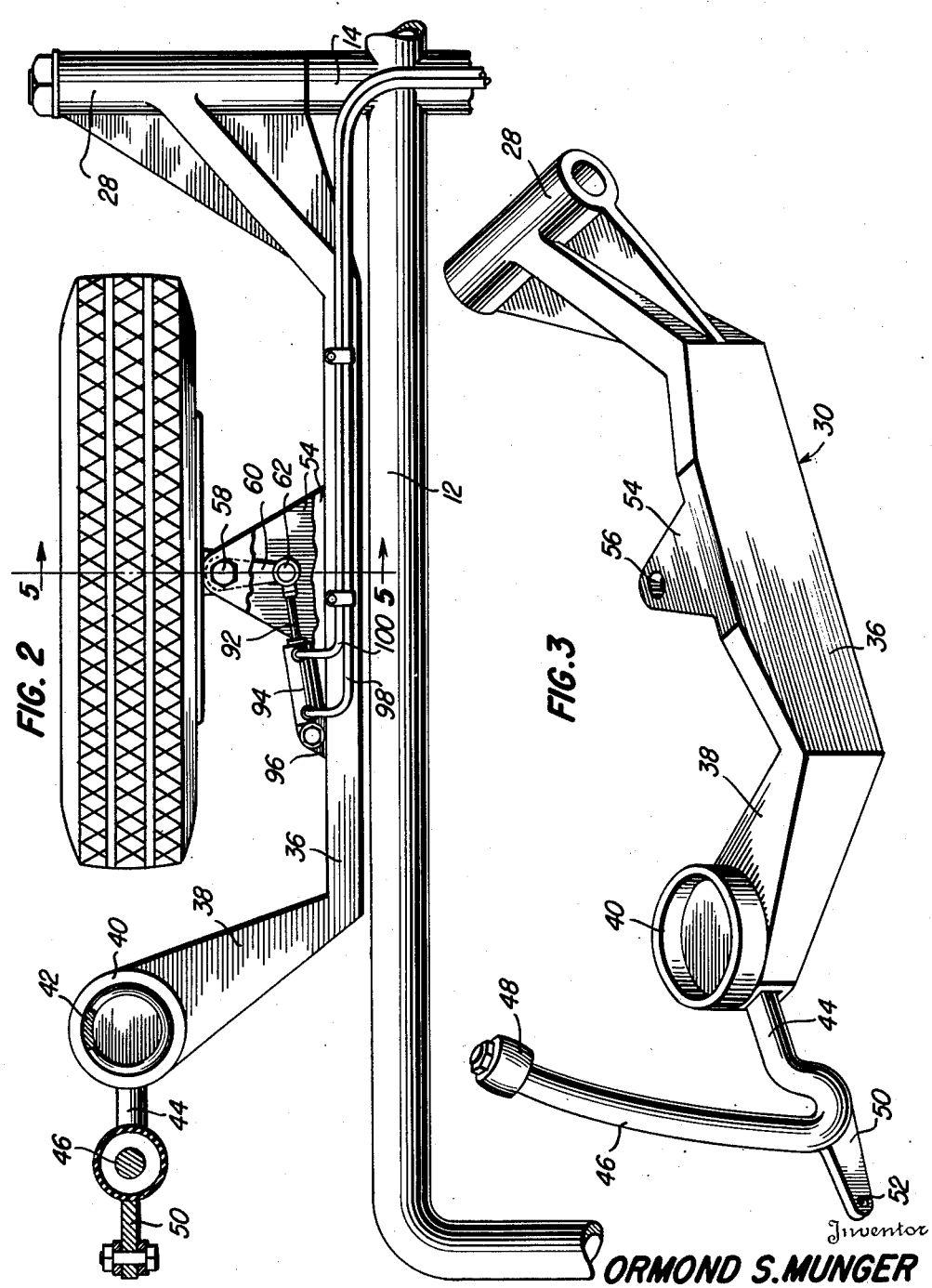

May 22, 1951     O. S. MUNGER     2,554,261
VEHICLE WHEEL SUSPENSION WITH HYDRAULIC STEERING
Filed Nov. 5, 1946     4 Sheets-Sheet 3
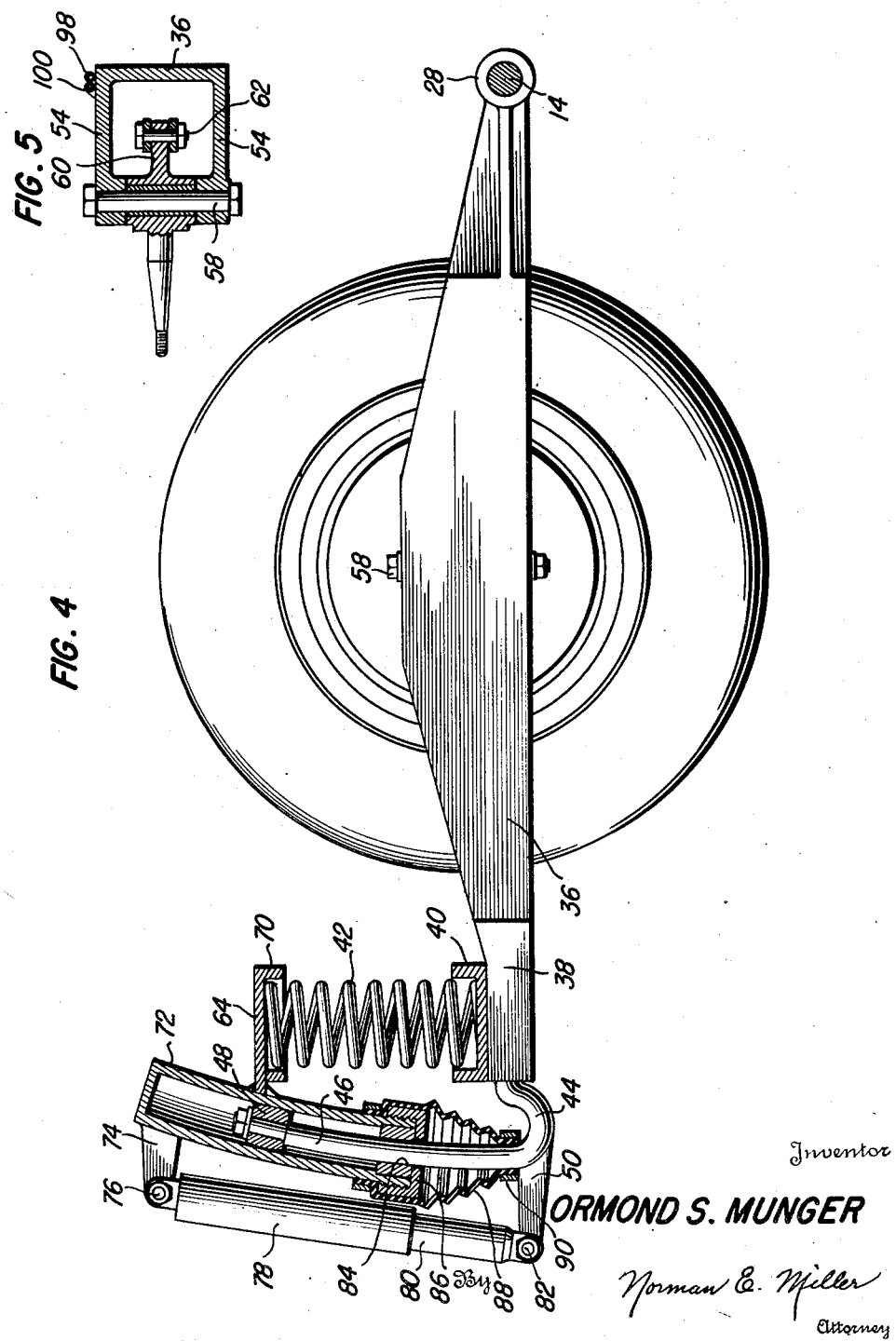
Inventor
ORMOND S. MUNGER
By Norman E. Miller
Attorney May 22, 1951      O. S. MUNGER      2,554,261
VEHICLE WHEEL SUSPENSION WITH HYDRAULIC STEERING Filed Nov. 5, 1946      4 Sheets-Sheet 4

Inventor
ORMOND S. MUNGER
By Norman E. Miller
Attorney

Patented May 22, 1951

2,554,261

UNITED STATES PATENT OFFICE 2,554,261

VEHICLE WHEEL SUSPENSION WITH HYDRAULIC STEERING

Ormond S. Munger, Rockville, Md.

Application November 5, 1946, Serial No. 707,951

13 Claims. (Cl. 180—79.2)

This invention relates to a vehicle wheel suspension and more particularly resides in a novel spring mechanism for resiliently supporting a vehicle frame upon its wheels.

A primary object of the invention is the provision of means for resiliently and independently securing each wheel to the frame of a vehicle.

An important object of the invention is the development of an arrangement whereby the entire spring suspension may be positioned outside the frame member, thereby permitting a lowering of the frame relative thereto, with a consequent depressing of the center of gravity of the vehicle.

A further important object of the invention is an advantageous unitary assembly of spring suspension and shock absorbing means for each wheel of the vehicle.

A still further object of the invention is the provision of hydraulic steering means particularly adapted to the independent wheel suspension of the foregoing objects.

Another object of the invention is the provision of a frame with its suspension at its extremities, whereby regardless of the wheelbase length, the springbase length is equal to the length of the frame.

Another and further object of the invention is the development of a wheel suspension providing adequate leverages, whereby the shock absorbers and springs may handle the weight of the vehicle as well as shocks and jolts incident to travel of the vehicle.

These and further important objects which will subsequently appear as the following description unfolds, are attained by the present invention, one form of which I have illustrated by way of example, in the drawings, in which:

Figure 2 is a top plan view of a portion of the frame showing a wheel supporting arm pivoted thereto, parts being shown in section;

Figure 3 is a perspective view of a wheel supporting arm;

Figure 4 is a view in side elevation of a wheel supporting arm, parts being shown in section for greater clarity of detail;

Figure 5 is a detail, being taken in vertical section substantially upon the line 5—5 of Figure 2;

Figure 1:
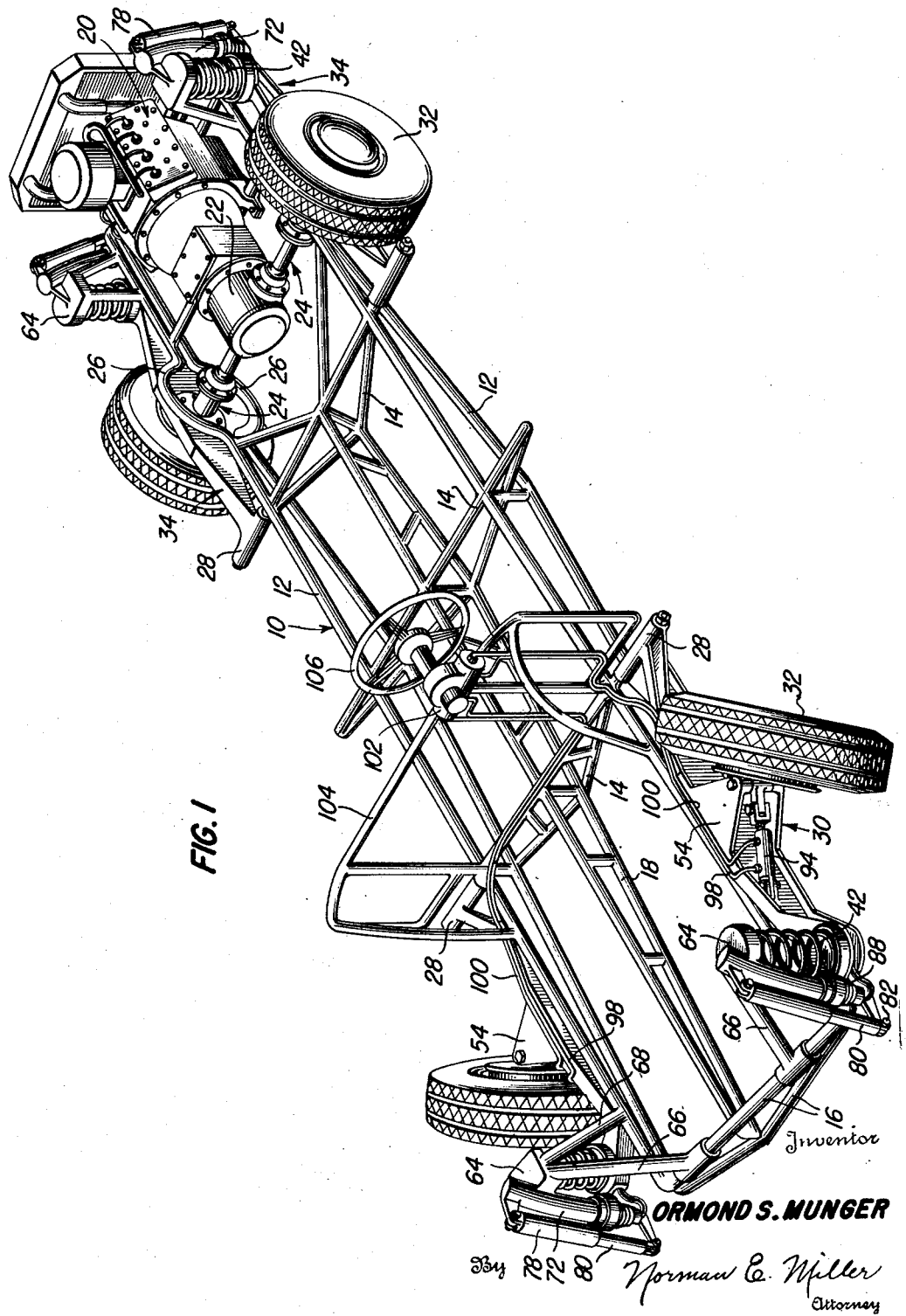
Figure 1 is a perspective view showing the invention applied to the chassis of a rear engine automobile.

The numeral 10 indicates generally the frame of a vehicle which may conveniently be formed of tubular members welded or otherwise rigidly united into a lightweight but sturdy structure. As shown the frame 10 embodies longitudinally disposed side members 12, reinforced at desired points by transverse spars 14 welded thereto, and completed by end members 16. Extending from its engagement with one end frame member 16, a longitudinal element 18 extends intermediate the side members 12 and terminates at a transverse spar 14, leaving an end portion of the frame open for the reception and mounting, in any desired manner therein, of a power plant designated generally at 20. The frame and chassis as thus far disclosed comprise a rear engined vehicle, although it will be understood that the chief features of my invention are not limited to any particular type of vehicle.

Associated with the power plant 20 in any conventional manner is the customary differential housing 22, having axle housings indicated generally at 24 and disposed between oppositely convexed portions 26 on the side frame members, defining openings for a purpose which will be later apparent.

Front and rear transverse spars 14 extend beyond the confines of the side frame members to provide pivots and fulcrums for the hubs 28 of front and rear suspension members denoted generally at 30, 34, each journalling a vehicle wheel 32 for vertical oscillation in a plane parallel to that of the frame side 12 in a manner hereinafter set forth.

Attention is now directed specifically to Figures 1, 2 and 3 for a clearer understanding of the front wheel supporting arm 30. Extending angularly forwardly from the hub 28 is a channel member having a flat side wall 36 disposed adjacent the side 12 of the vehicle frame 10, and merging into an angularly disposed portion 38 on the same side thereof as the hub 28. Formed upon the upper surface of 38 is an annular rim 40 comprising a seat for a coil spring 42. Extending forwardly from 38 is an arm 44 having an upstanding rod 46 which is arcuately curved about the axis of hub 28 as a center. The rod 46 carries a guide preferably in the form of a slide or piston 48, detachably secured at the upper end thereof for a purpose to be later set forth. A lug 50 constitutes the forward terminus of arm 30 and is apertured as at 52. Extending transversely from the upper and lower channel walls of member 36 are upper and lower horizontal brackets 54, having alined vertical bores 56 which receive a king pin 58 for journalling the axle of the wheel spindle. A steering arm 60 is formed or secured upon the spindle for engagement by a pin 62 included in a steering mechanism to be later disclosed.

At the front end of frame 10, a block 64 is mounted by legs 66 and 68 upon the front frame and side frame member 16 and 14 (see Figure 1). Rigidly carried thereby is an inverted rim or seat 70 abutting the upper end of coil spring 42 and an arcuate cylinder 72 constituting a guide for the piston 48 and rod 46, while a lug 74 is journalled at 76 to a cylinder 78 which with a piston 80 slidable therein forms a hydraulic or pneumatic shock absorber, pivoted at 82 to the arm 50 at its aperture 52. A suitable bearing block 84, which is preferably an "oilite" bearing, is retained in the lower end of cylinder 72 by a threaded gland 86, a flexible covering 88 being secured about the gland 86 and is attached to the rod 46 at its lower end as at 90 to envelope and house the sliding engagement and protect the packing from dust or the like.

It will now be evident that the front wheels are independently mounted whereby they may adjust themselves to the inequalities of a road without necessitating the twisting of the vehicle about its longitudinal axis, and that they have a true floating movement, in a vertical plane which is parallel to the sides of the vehicle frame, about a transverse pivot. The vehicle frame 10 is supported upon the wheel arm support at the front end of the latter by a compression spring which acts through a lever arm of approximately 2 to 1 advantage to apply the vehicle weight to the wheel spindle, thus permitting the use of a softer acting compression spring 42, thereby improving the vehicle ride. It should be here noted that the guide members 46, 48 and 72 are free-floating, being all struck upon the same radius about a common center, the hub 28, and hence there is true oscillatory motion without side-thrust, thus minimizing wear on the guide members. The shock absorbers 78 and 80 are mounted at the extreme forward end, whereby they have the maximum leverage and also apply their force at the extreme forward end of the frame 10. I desire to direct particular attention to the fact that although the wheels 32 are set back along the vehicle, the point of movement is closely adjacent the front of the frame, thus causing the frame to have its movement at its four corners, thereby effectively increasing the wheelbase to that of the frame, as its maximum.

As shown in Figure 5, steering arm 60 is conveniently received in the channel of member 36 between brackets 54, and is articulated by pin 62 with piston rod 92 carrying a double acting piston reciprocable in hydraulic cylinder 94 pivoted between a pair of horizontal brackets or lugs 96 extending laterally from the beam 36. Suitable hydraulic lines 98, 100 connect the opposite ends of the hydraulic cylinder with opposite sides of a master steering cylinder 102 mounted upon the dash portion 104 of the vehicle frame. A conventional steering wheel 106 is provided to operate by any suitable mechanism a double acting piston, not shown, in the master cylinder 102. As shown in Figure 1, hydraulic lines extend to both of the front wheels, the lines being sufficiently flexible to accommodate the angular displacement of the wheel support arms about their pivotal hubs 28, whereby the vertical swinging of the wheels and their support arms will not affect the hydraulic steering actuation. It will be apparent that pressure impulses from the master cylinder through lines 98 will turn the wheel spindles in one direction while those of lines 100 will compel reverse movement.

The construction of the hydraulic steering mechanism does not in itself form part of my invention and may be of any known type.

Figure 7:
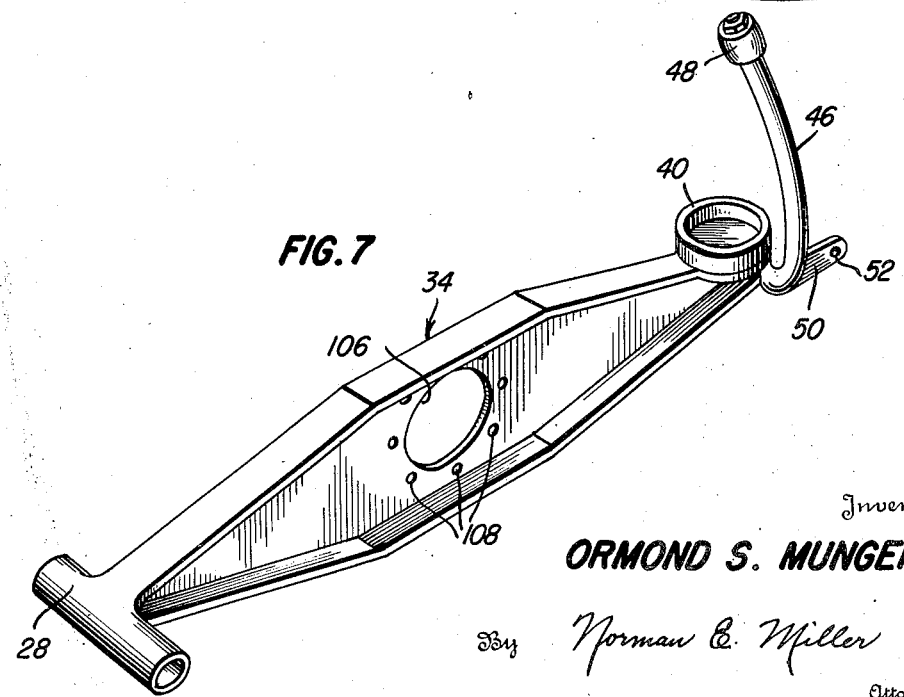

The rear wheel support arms 34 are similar in principle to arm 30 as hereinbefore described but are slightly modified to accommodate the driving engagement with the vehicle power plant 20. As illustrated most clearly in Figure 7, the rear wheel support arm 34 includes a hub 28 from which extends rearwardly a channel beam centrally apertured at 106, which aperture is surrounded by a plurality of bores 108. At the rear end, beam 34 has an annular rim 40 forming a seat for a coil spring 42, and carries an arcuately shaped piston rod 46 with detachable piston slide 48 and a lug 50, apertured at 52. The arm 34 is similar to arm 30 except for the central aperture and bores which replaces the steering construction of 30.

Figure 6:
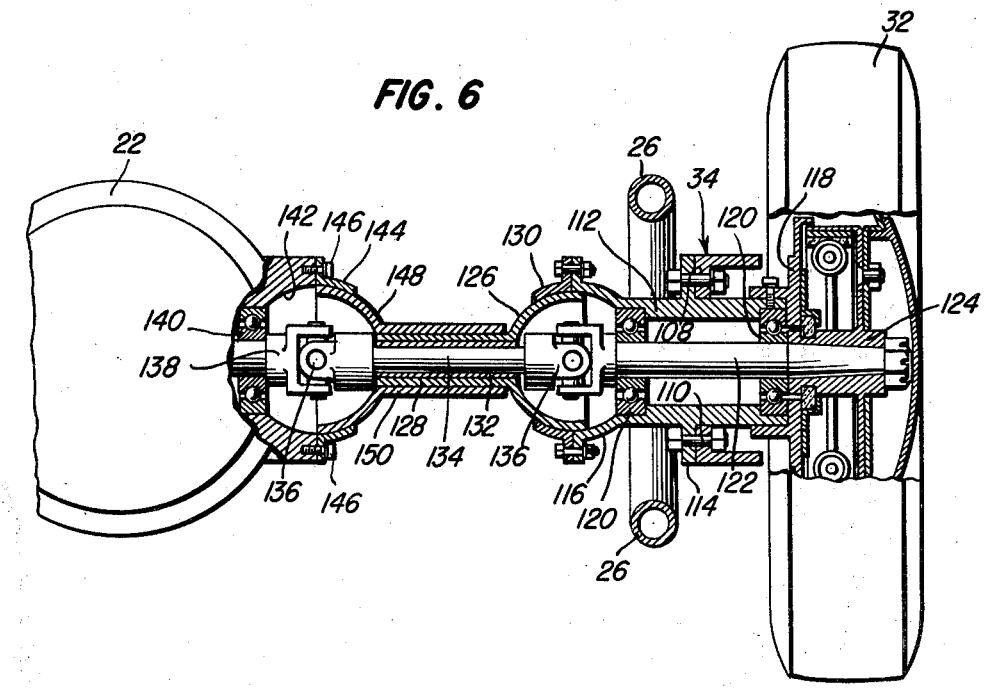
Figure 6 is a vertical longitudinal sectional view through one of the rear axle housings; and, Figure 7 is a perspective view of a wheel supporting arm for a rear wheel.

As shown more clearly in Figures 1 and 6, the member 34 has secured through the aperture 106 as by bolts 110 fastened in bores 108, an intermediate flange 114 of a tubular axle housing 112 terminating at its inner end in a bell housing 116. At the other end, housing 112 carries a brake shoe plate 118 and is provided with a plurality of bearings 120 for journalling an axle 122 which receives the hub 124 of wheel 32. The bell housing 116 is adapted to receive oscillatably therein a spherical end 126 of a sleeve 128, which end is retained by the bell housing flanged ring 130. The sleeve 128 has a journal bearing 132 for rotatably supporting the short section 134 of the axle drive shaft, which has its ends articulated, as by universal joints 136 with the end of axle 122 and with a differential shaft 138. The latter extends from a bearing 140 in the differential housing 22 into a chambered recess 142 having a spherical retaining gland 144 secured as at 146 for oscillatably retaining the bell housing 148 on a sleeve 150 which telescopes upon sleeve 128.

It may thus be seen that the rear wheels are independently mounted and function in exactly the same manner as the front wheels. The series of articulated shafts and oscillatable housings permit a positive drive during the changing angularities of the drive shaft occasioned by the independent floating action of the wheels. As in the front end support, the frame 10 is journalled at its corners and the knee action of the wheel suspension is effectively dampened by the leverage through which the supporting springs and hydraulic shock absorbers operate.

I claim:

1. In a vehicle, in combination, a frame, a wheel support including a lever pivoted at its inner end for oscillating movement in a vertical plane, said lever having an intermediate portion laterally offset from the ends thereof, journalling means for rotatably mounting a wheel on said intermediate laterally offset portion of said lever and supporting means for resiliently connecting said lever to said frame adjacent the other end of said lever and at the outer end of said frame.

2. In a vehicle, in combination, a frame, a wheel support including a lever pivoted at its inner end for oscillating movement in a vertical plane, said lever having an intermediate portion laterally offset from the ends thereof, journalling means for rotatably mounting a wheel on said intermediate laterally offset portion of said lever and supporting means for resiliently connecting said lever to said frame adjacent the other end of said lever and at the outer end of said frame, said lever having laterally extending brackets on said laterally offset portion, said journalling means including a wheel spindle journalled between said brackets.

3. In a vehicle, in combination, a frame, a wheel support including a lever pivoted at its inner end for oscillating movement in a vertical plane, journalling means for rotatably mounting a wheel on said lever and supporting means for resiliently connecting said lever to said frame adjacent the other end of said lever said lever having laterally extending brackets, said journalling means including a wheel spindle journalled between said brackets and hydraulic steering means connected with said spindle said hydraulic steering means including an actuating element consisting of a hydraulic cylinder and piston, said cylinder and piston interconnecting the spindle and lever.

4. The combination of claim 2 wherein the adjacent surfaces of said frame and lever have spaced, parallel vertical faces.

5. The combination of claim 4 wherein said laterally extending brackets are on the opposite side of said lever from the vertical face thereof.

6. A front wheel suspension for a vehicle comprising a front wheel support including a lever pivoted at one end to the frame of a vehicle and at its other end resiliently secured to the end of a vehicle frame for vertical reciprocation relative thereto, a lateral offset in said lever intermediate its ends, a wheel support journaled on said offset for movement in a horizontal plane, a wheel journaled on said support and actuating mechanism for said wheel support including a hydraulic cylinder pivoted to said offset, a piston movable in said cylinder and connected to said wheel support and means for applying hydraulic pressure into said cylinder for steering said wheel.

7. The combination of claim 6 including horizontal parallel brackets on said lateral offset, said wheel support being journaled between said brackets.

8. The combination of claim 7 including flexible conduits communicating with said cylinder, said conduits being mounted on said lever and being secured to and supported by the vehicle frame at the pivotal connection of said lever thereto.

9. In a vehicle, in combination, a frame having a side member, a wheel support including a lever journaled at its inner end to said member at the outer side thereof, supporting means resiliently connecting the outer end of said lever to the outer end of said frame member, means for journaling a wheel on said lever intermediate its ends and laterally outwardly thereof, said lever and wheel being oscillatable in a vertical plane parallel to and spaced from said frame member, said lever having a central portion with outwardly disposed ends, said wheel mounting means being carried by said central portion and said wheel being disposed between said ends.

10. The combination of claim 9 wherein the outer end of said lever and of said frame side member are connected outwardly of said supporting means by a cylinder and piston guide for oscillation in a vertical plane.

11. In a vehicle, in combination, a frame, a wheel support including a lever pivoted at its inner end for oscillating movement in a vertical plane, said lever having an intermediate portion laterally offset from the ends thereof, journaling means for rotatably mounting a wheel on said intermediate laterally offset portion of said lever and supporting means for resiliently connecting said lever to said frame adjacent the other end of said lever and adjacent the outer end of said frame.

12. In a vehicle, in combination, a frame, a vehicle front wheel support including a lever pivoted at its inner end to said frame inwardly of an outer end of said frame for oscillating movement in a vertical plane, journaling means for rotatably mounting a vehicle front wheel on said lever, supporting means resiliently connecting said lever to said frame adjacent their outer ends, a shock absorber connecting said lever to said frame outwardly of the connection of the supporting means to said lever and frame, guide means interposed between said shock absorber and said supporting means and connecting said lever and frame for relative oscillatory movement.

13. The combination of claim 12 wherein said guide means comprises an arcuate cylinder and an arcuate piston rod and piston slidably disposed therein, said cylinder and piston being rigidly attached, one to said frame and the other to said lever, a packing means for said piston rod and said cylinder, a housing enclosing said packing means and attached to said piston rod and to said cylinder.

ORMOND S. MUNGER.

REFERENCES CITED

The following references are of record in the file of this patent:

UNITED STATES PATENTS

| Number | Name | Date |
|---|---|---|
| 819,302 | Munsing | May 1, 1906 |
| 860,023 | Fulton | July 16, 1907 |
| 1,572,060 | Yarnall | Feb. 9, 1926 |
| 2,075,585 | Martin | Mar. 30, 1937 |
| 2,090,141 | Newton | Aug. 17, 1937 |
| 2,199,392 | Dabrasky | May 7, 1940 |
| 2,218,634 | Best | Oct. 22, 1940 |
| 2,352,446 | Pointer | June 27, 1944 |

FOREIGN PATENTS

| Number | Country | Date |
|---|---|---|
| 604,947 | France | Feb. 8, 1926 |